US010406745B2

(12) United States Patent
Baumann et al.

(10) Patent No.: US 10,406,745 B2
(45) Date of Patent: Sep. 10, 2019

(54) POLYAMIDE-BASED POLYMER POWDER, USE THEREOF IN A MOLDING METHOD, AND MOLDED ARTICLES MADE FROM SAID POLYMER POWDER

(71) Applicant: Evonik Degussa GmbH, Essen (DE)

(72) Inventors: Franz Erich Baumann, Duelmen (DE); Wolfgang Diekmann, Waltrop (DE); Beatrice Kueting, Marl (DE); Heike Stemmer, Haltern am See (DE); Maik Grebe, Bochum (DE); Kristiane Warnke, Recklinghausen (DE); Sylvia Monsheimer, Haltern am See (DE); Harald Haeger, Luedinghausen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/783,817

(22) Filed: Oct. 13, 2017

(65) Prior Publication Data

US 2018/0036938 A1     Feb. 8, 2018

Related U.S. Application Data

(63) Continuation of application No. 13/581,085, filed as application No. PCT/EP2011/055316 on Apr. 6, 2011.

(30) Foreign Application Priority Data

Apr. 9, 2010 (DE) .......... 10 2010 014 443
Dec. 2, 2010 (DE) .......... 10 2010 062 347

(51) Int. Cl.
| | |
|---|---|
| C09D 5/03 | (2006.01) |
| C08L 77/02 | (2006.01) |
| C08L 77/06 | (2006.01) |
| B29C 64/106 | (2017.01) |
| B29C 64/153 | (2017.01) |
| B33Y 70/00 | (2015.01) |

(52) U.S. Cl.
CPC .......... *B29C 64/106* (2017.08); *B29C 64/153* (2017.08); *C08L 77/02* (2013.01); *C08L 77/06* (2013.01); *C09D 5/03* (2013.01); *B33Y 70/00* (2014.12); *C08L 2205/02* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 3,927,141 A * | 12/1975 | Feldman | .................. C09D 5/03 525/428 |
| 4,661,585 A | 4/1987 | Feldmann et al. | |
| 5,032,633 A * | 7/1991 | Schlobohm | .............. C08K 5/43 524/158 |
| 5,070,156 A | 12/1991 | Feldmann et al. | |
| 5,670,575 A * | 9/1997 | Flexman, Jr. | ........... C08L 77/00 525/179 |
| 7,795,339 B2 | 9/2010 | Monshelner et al. | |
| 7,906,063 B2 | 3/2011 | Monsheimer et al. | |
| 8,066,933 B2 | 11/2011 | Monsheimer et al. | |
| 8,119,715 B2 | 2/2012 | Monshemer et al. | |
| 8,173,258 B2 | 5/2012 | Monsheimer et al. | |
| 2004/0106691 A1 | 6/2004 | Monsheimer et al. | |
| 2004/0138344 A1* | 7/2004 | Allen | ..................... C08G 69/46 523/326 |
| 2006/0071359 A1 | 4/2006 | Monsheimer et al. | |
| 2006/0202395 A1 | 9/2006 | Monshelmer et al. | |
| 2006/0223928 A1 | 10/2006 | Monsheimer et al. | |
| 2006/0244169 A1 | 11/2006 | Monsheimer et al. | |
| 2008/0116616 A1* | 5/2008 | Monsheimer | .......... C08L 77/06 264/405 |
| 2008/0166496 A1* | 7/2008 | Monsheimer | .............. C08J 3/14 427/510 |
| 2009/0236775 A1 | 9/2009 | Monsheimer et al. | |
| 2010/0063330 A1 | 3/2010 | Martinoni | |

(Continued)

FOREIGN PATENT DOCUMENTS

| | | |
|---|---|---|
| CN | 101148541 A | 3/2003 |
| DE | 3441708 A1 | 5/1986 |

(Continued)

OTHER PUBLICATIONS

International Search Report and Written Opinion of the International Searching Authority dated Jun. 8, 2011 in PCT/EP2011/055316 (with English translation and English Translation of Categories of Cited Documents).

*Primary Examiner* — Ronak C Patel

(74) *Attorney, Agent, or Firm* — Oblon, McClelland, Maier & Neustadt, L.L.P.

(57) ABSTRACT

Disclosed herein is a polymer powder containing a polyamide of AB type, produced by polymerizing at least one lactam having from 10 to 12 carbon atoms in a monomer unit or by polycondensing at least one corresponding ω-aminocarboxylic acid having from 10 to 12 carbon atoms in a monomer unit, and a polyamide of AABB type, produced by polycondensing at least one diamine and at least one dicarboxylic acid having respectively from 10 to 14 carbon atoms in monomer units. The polyamide of the AB type and the polyamide of the AABB type are prepared separately and then coprecipitated to form the polymer powder, and the polymer powder is a physical mixture of the polyamide of the AB type and the polyamide of the AABB type. Also disclosed herein is a method for producing the polymer powder.

18 Claims, No Drawings

(56) References Cited

U.S. PATENT DOCUMENTS

2011/0130515 A1    6/2011   Monsheimer et al.
2012/0041132 A1    2/2012   Monsheimer et al.

FOREIGN PATENT DOCUMENTS

| DE | 10 2004 020 453 A1 | 11/2005 |
|----|--------------------|---------|
| EP | 1 642 923 A1 | 4/2006 |
| WO | WO 2008/057844 A1 | 5/2003 |
| WO | WO 2005/010087 A1 | 2/2005 |
| WO | WO 2005/032979 A1 | 9/2005 |
| WO | WO 2005/082973 A1 | 9/2005 |
| WO | WO 2005/085326 A1 | 9/2005 |
| WO | WO 2005/105891 A1 | 11/2005 |
| WO | WO 2005/111119 A1 | 11/2005 |
| WO | WO 2011/124278 A1 | 10/2011 |

* cited by examiner

POLYAMIDE-BASED POLYMER POWDER, USE THEREOF IN A MOLDING METHOD, AND MOLDED ARTICLES MADE FROM SAID POLYMER POWDER

This application is a Continuation of U.S. Non-Provisional application Ser. No. 13/581,085, which was filed on Aug. 24, 2012. application Ser. No. 13/581,085 is a National Stage of PCT/EP2011/055316, which was filed on Apr. 6, 2011. This application is based on and claims the benefit of priority to German Application No. 10 2010 014 443.6, which was filed on Apr. 9, 2010, and to German Application No. 10 2010 062 347.4, which was filed on Dec. 2, 2010.

The rapid provision of prototypes is a task frequently encountered in very recent times. Particularly suitable processes use operations based on pulverulent materials, where the de sire d structures are produced layer-by-layer by selective melting and hardening. Supportive structures for overhangs and undercuts can be omitted here, since the powder bed surrounding the molten regions provides sufficient support. The subsequent operation of removing supports is likewise omitted. The processes are also suitable for producing small runs. In the latter case, the mechanical properties of the sintered parts are increasingly required to be as close as possible to those of injection molded parts; in particular, there is not yet complete satisfaction with the toughness of the sintered parts made of powders of the prior art. Heat resistance is also subject to increasingly stringent requirements. The powders obtainable as in DE102004020453, based on ABBB polyamides, permit production of moldings that have higher heat resistance, but the toughness of these is not yet fully satisfactory.

The invention relates to coprecipitated polymer powders based on a polyamide of the AABB type, produced by polycondensing diamines with dicarboxylic acids, with polyamides of the AB type, produced from lactams and/or aminocarboxylic acids, the use of said powder in shaping processes, and moldings produced by a layer-by-layer process which melts regions of a powder layer selectively by introducing electromagnetic energy, with use of said powder. Once the regions previously melted layer-by-layer have been cooled and hardened, the molding can be removed from the powder bed.

The selectivity of the layer-by-layer process here can be achieved, for example, by way of susceptors, inhibitors, or masks, or by way of focused introduction of energy, for example by a laser beam, or by way of glass fibers. The introduction of energy is achieved by way of electromagnetic radiation.

Some processes which can produce moldings of the invention from the powder of the invention are described below, but without any intention that the invention be restricted thereto.

A process which has particularly good suitability for the purposes of rapid prototyping is selective laser sintering. In this process, plastics powders are briefly irradiated selectively with light from a laser beam in a chamber, and the powder particles encountered by the laser beam therefore melt. The molten particles coalesce and rapidly solidify again to give a solid mass. This process can produce three-dimensional products simply and rapidly by using light for repeated irradiation of a succession of freshly applied layers.

The patent specifications U.S. Pat. No. 6,136,948 and WO 96/06881 (both DTM Corporation) provide a detailed description of the laser sintering (rapid prototyping) process for producing moldings from pulverulent polymers. A wide variety of polymers and copolymers is claimed for said application, e.g. polyacetate, polypropylene, polyethylene, ionomers, and polyamide.

Other processes with good suitability are the SIB process as described in WO 01/38061 and a process described in EP 1 015 214. Both processes operate with large-surface-area infrared heating to melt the powder. The selectivity of the melting process is achieved in the first process by applying an inhibitor and in the second process it is achieved by a mask. DE 103 56 193 describes another process. In this, the energy needed for the fusion process is introduced by a microwave generator and the selectivity is achieved by applying a susceptor.

The rapid prototyping or rapid manufacturing processes (RP or RM processes) mentioned can use pulverulent substrates, in particular polymers, preferably selected from polyester, polyvinyl chloride, polyacetal, polypropylene, polyethylene, polystyrene, polycarbonate, poly(N-methylmethacrylimide) (PMMI), polymethyl methacrylate (PMMA), ionomer, polyamide, or a mixture thereof.

WO 96/30195 describes a polymer powder which is suitable for the laser sintering process and which exhibits no overlap of the melt peak and recrystallization peak when melting behavior is determined by differential scanning calorimetry at a scanning rate of from 10 to 20 C/min, and which has a degree of crystallinity of from 10 to 90%, likewise determined by DSC, and has a number-average molecular weight Mn of from 30 000 to 500 000 and a quotient $M_w/M_n$ in the region from 1 to 5.

DE 197 47 309 describes the use of a nylon-12 powder which has an elevated melt peak and elevated enthalpy of fusion and which is obtained by reprecipitating a polyamide previously produced by ring-opening and subsequent polycondensation of laurolactam. A polyamide of the AB type is involved here. However, the heat resistance of the moldings formed therefrom by a sintering process is not substantially above that of injection-molded PA12 parts. The powders obtainable as in DE102004020453 and based on ABBB polyamides permit production of moldings that have high heat resistance; their use in a mixture with separately produced powders based on precipitated powders made of AB polyamides generally encounters problems, because the different melting point of these leads to inhomogeneous structure of the sintered parts, the toughness of which is therefore not entirely satisfactory.

It was therefore an object of the present invention to provide a polymer power which permits production of moldings which have maximum toughness and which have increased heat resistance and which can be used in any of the layer-by-layer processing methods.

Surprisingly, it has now been found that by using precipitative crystallization to coprecipitate suitably selected polyamides it is possible to produce polymer powders which avoid the problems mentioned and which have mechanical properties like those of a polymer powder of the prior art, for example as in DE 197 47 309 or else DE102004020453. Coprecipitation of AB polyamides having from 10 to 12 carbon atoms in the monomer unit and of AABB polyamides based on diamines and dicarboxylic acids respectively having from 10 to 14 carbon atoms in the respective monomer unit is successful in producing powders which melt uniformly and which can be processed to give impact-resistant moldings with increased heat resistance.

When the powders produced by coprecipitation are compared with powders of the prior art they moreover have better powder-flow properties and, respectively, application properties. The amount needed of powder-flow aid can therefore be reduced, or powder-flow aid can be entirely omitted. This is advantageous for processing, in particular in the laser sintering process. There is less tendency toward what is known as curl.

Particularly suitable coprecipitates are those of: PA11 with PA1010, PA11 with PA1012, PA12 WITH PA1012, PA12 with PA1212, and PA12 with PA1013.

The present invention therefore provides a polymer powder for use in a layer-by-layer process in which regions of the respective powder layer are melted selectively by introducing electromagnetic energy, comprising:
at least one polyamide of the AB type, produced by polymerizing lactams having from 10 to 12 carbon atoms in the monomer unit or by polycondensing the corresponding ω-aminocarboxylic acids having from 10 to 12 carbon atoms in the monomer unit and
at least one polyamide of the AABB type, produced by polycondensing diamines and dicarboxylic acids having respectively from 10 to 14 carbon atoms in the monomer units, where the polyamide of the AB type can comprise up to 20 mol % of the AABB comonomer units and the polyamide of the AABB type can comprise up to 20 mol % of the AB monomer units.

AB polyamide used preferably comprises PA11 or PA12, and AABB polyamide used preferably one from the group PA1010, PA1012, PA1212, and PA1013. It is particularly preferable to coprecipitate PA11 with PA1010, PA11 with PA1012, PA12 with PA1012, PA12 with PA1212, and PA12 with PA1013. The proportion of the AABB polyamide here is from 2 to 98% by mass, preferably from 10 to 90% by mass, and particularly preferably from 30 to 70% by mass. The melting point of the coprecipitated polymer powder of the invention here, determined by means of DSC, is at least 175° C., preferably at least 180° C., and particularly preferably at least 185° C.

Suitability for the coprecipitation process is further exhibited by copolyamides of the AABB type in which up to 20 mol % of the molar-equivalent diamines and dicarboxylic acids have been replaced by a lactam and, respectively, an ω-aminocarboxylic acid having from 10 to 12 carbon atoms, and also by copolyamides of the AB type in which up to 20 mol % of the lactams and, respectively, ω-aminocarboxylic acids having from 10 to 12 carbon atoms have been replaced by molar-equivalent diamines and dicarboxylic acids having from 10 to 14 carbon atoms. The use of said coprecipitates comprising copolyamide is advantageous by way of example when the intention is to construct parts with low shrinkage. It is preferable that the respective proportion of comonomer in one or both polyamides to be coprecipitated is restricted to 10 mol %, and it is very preferable that the proportion of comonomer is at most 5 mol %, with a view to higher heat resistance.

A feature of the polyamides to be used in the invention is that the powder comprises at least one AABB polyamide and at least one AB polyamide. Homopolymers involved here respectively have the general formula:

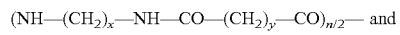 and

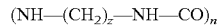

and copolyamides involved here respectively comprise up to 20 mol % of monomers of the respective other type.

Not only the AB component but also the AABB component here can have entirely linear structure or can have a small degree of branching, and the number of acid end groups can be greater, the same as, or less than the number of amino end groups. Specific regulators of the prior art can be added for this purpose during the polycondensation process. Particular preference is given to a balanced ratio of acid end groups to amino end groups, and very particular preference is given to an excess of acid with an acid:amine ratio of from 1.2:1 to 5:1. In another preferred sector, there is an excess of the amino end groups with an amine:acid ratio of from 1.2:1 to 5:1.

ISO 1874-1 regulates the nomenclature of the polyamides. In particular, Annex A describes the definition and characterization of aliphatic linear polyamides. Polyamides of the type XY, the use of which accords with the invention, are obtained from polycondensation of diamines with dicarboxylic acids. x is the number of C atoms in the diamine, and y is the number of C atoms in the dicarboxylic acid. The preferred powder comprises not only diamines but also dicarboxylic acids of aliphatic (linear) type. Examples of monomer units used here are diamines from the following group: decanediamine, undecanediamine, and 1,12-diaminododecane. Examples of monomers for the dicarboxylic acids are sebacic acid (decanedioic acid, b=8), dodecanedioic acid (b=10), brassylic acid (b=11), and tetradecanedioic acid (b=12).

Examples of suitable monomers of the AB type are ω-aminoundecanoic acid, ω-aminododecanoic acid, and ω-laurolactam.

The present invention also provides processes for producing a polymer powder of the invention, where the respective polyamide components are codissolved by heating in an alcohol having from 1 to 3 carbon atoms, the temperature is lowered in one or more stages to a temperature at which a copolyamide precipitates, the copolyamide is isolated from the solvent and/or is dried, and auxiliaries or fillers are optionally mixed into the powder.

In one embodiment, the polyamide components are dissolved under autogenous pressure at a temperature of from 130° C. to 180° C., and then the temperature is lowered in one or more stages to from 90° C. to 128° C.

The powders of the invention are preferably produced by coprecipitating the AB polyamides and AABB polyamides from alcoholic solution under pressure as in DE-A 3510689. It is preferable to use ethanol as solvent. The dissolution temperatures are kept in the range from 135 to 175° C., preferably from 140 to 165° C., and the cooling rates are kept in the range from 0.1 to 2.0 K/min, preferably in the range from 0.4 to 1.0 K/min. The precipitation temperatures are in the range from 90 to 130° C., preferably in the range from 105 to 125° C. After the dissolution process, the temperature is preferably kept at from 110° C. to 128° C. for from 10 minutes to 3 hours, and then the temperature is lowered in one or more further stages to from 90° C. to 118° C.

Manual experiments can be used in a specific individual case to determine the dissolution conditions and precipitation conditions that are advantageous for the respective polyamide mixture. The polyamide concentrations to be selected are from 5 to 30% by weight, based on the entirety of all of the polyamides used, preferably from 10 to 25% by weight, particularly preferably from 13 to 22% by weight. Preliminary experiments are to be used to determine the dissolution temperatures required in order to obtain a polyamide solution that is optically clear, and it is also necessary here that the polyamide with the respectively highest melting point dissolves completely.

In order to obtain polyamide powder with relatively narrow grain size distribution, it is possible to precede the actual precipitation process with a nucleation phase as in DE19708946, in which the PA solution remains optically clear and no exothermic crystallization is observed. For this, the alcoholic solution is stirred isothermally at from 2 K to 20 K, preferably from 5 K to 15 K, above the subsequent precipitation temperature, for the time previously mentioned, and the temperature is then lowered at the cooling rates above to the precipitation temperature, which is to be kept as constant as possible.

Suitable assemblies are stirred tanks, and blade stirrers are preferably used, but it is readily possible to carry out the precipitation process in other pressure-tight apparatuses and/or to use other stirrer units. One or more of the polyamides to be reprecipitated can be subjected to a prior extraction process in order to remove any residual monomers and, respectively, oligomers that might possibly disrupt subsequent processing.

The invention further provides coprecipitated powders made of AB polyamides having from 10 to 12 carbon atoms in the monomer unit and of AABB polyamides based on diamines and dicarboxylic acids respectively having from 10 to 14 carbon atoms in the respective monomer unit, and also the abovementioned coprecipitates which melt uniformly and which are based on one or more copolyamides, which comprise up to 20 mol % of comonomers of the respective other type, which can be processed to give impact-resistant moldings with increased heat resistance. Particularly suitable coprecipitates are those of PA11 with PA1010, PA11 with PA1012, PA 12 with PA1012, PA12 with PA1212, and PA12 with PA1013.

The present invention also provides moldings produced by a layer-by-layer process which melts regions of the respective layer selectively by introducing electromagnetic energy, where these are characterized in that the powders are coprecipitates of AB polyamides having from 10 to 12 carbon atoms in the monomer unit and of AABB polyamides based on diamines and dicarboxylic acids having respectively from 10 to 14 carbon atoms, and also the abovementioned coprecipitates which melt uniformly and which are based on one or more copolyamides which comprise up to 20 mol % of comonomers of the respective other type. Particularly suitable moldings are those based on coprecipitates of PA11 with PA1010, PA11 with PA1012, PA12 with PA1012, PA12 with PA1212, and PA12 with PA1013.

An advantage of the polymer powders of the invention is that they are used in a layer-by-layer process in which regions of the respective layer are melted selectively to give moldings with increased heat resistance, higher toughness values, better dimensional accuracy, and better surface quality, when comparison is made with moldings made of conventional polyamide powders.

The mechanical properties exhibited by the moldings produced from the powders of the invention here are good and similar to those of moldings produced from conventional powders. The processability of the powder of the invention is also comparable with that of conventional polyamide powders.

The polymer powder of the invention is described below, without any intention of resultant restriction of the invention.

Powder of the invention is obtained for example by a process based on DE 29 06 647 B1 or through DE 19708946, where a poly amide of the AB type is used as starting material. The polyamide mixture made of AABB polyamide and AB polyamide is dissolved in ethanol and precipitated in crystalline form under certain conditions. A precautionary sieving process and further classification or cold grinding optionally follows. The person skilled in the art can easily discover the conditions through exploratory preliminary experiments.

The melting point of the coprecipitated polymer powder of the invention here, determined by means of DSC, is at least 175° C., preferably at least 180° C., and particularly preferably at least 185° C.

Another feature of the powder of the invention is good powder-flow properties and, respectively, good application properties. The amount to be used of the powder-flow aid can be reduced, or powder-flow aid can be omitted entirely.

Solution viscosity in 0.5% m-cresol solution in accordance with ISO 307 is preferably from 1.4 to 2.1 for the polyamide powders of the invention, particularly preferably from 1.5 to 1.9, and very particularly preferably from 1.6 to 1.7.

The polymer powder of the invention preferably comprises polyamide powder of the AB type, and also of the AABB type, with an average particle size of from 10 to 250 µm, preferably from 45 to 150 µm, and particularly preferably from 50 to 125 µm.

The quantitative ratio of AABB polyamide to AB polyamide in the invention is from 1:99 to 99:1, preferably from 10:90 to 90:10, very preferably from 30:70 to 70:30, parts by mass of the respective polyamides. If copolyamides are used, the ratios by mass mentioned apply to the individual AABB- and, respectively, AB-based copolyamides as an entirety; it is of no great importance here that the proportions of the other monomer type are respectively identical.

The bulk densities of the polymer powder of the invention, measured in accordance with DIN 53468, are from 300 to 700 g/l, preferably from 400 to 600 g/l.

The polymer powder of the invention moreover preferably has BET surface areas of from 1 to 15 $m^2/g$, measured with nitrogen gas in accordance with DIN ISO 9277:2003-05 (volumetric method), particularly preferably from 2 to 10 $m^2/g$, and very particularly preferably from 2.5 to 7 $m^2/g$.

The starting pellets for processing to give powders of the invention are marketed by way of example by Evonik-Degussa, Marl, Germany (nylon-12, trade name VESTAMID L product line, nylon-10,10, VESTAMID Terra DS product line, nylon-10,12, VESTAMID Terra DD product line), or by ARKEMA, Serquigny, France (RILSAN B, nylon-11, RILSAN A, nylon-12).

Polymer powder of the invention can moreover comprise auxiliaries and/or fillers, and/or further organic or inorganic pigments. Examples of auxiliaries of this type can be powder-flow aids, e.g. precipitated and/or fumed silicas. Fumed silicas are marketed by way of example with trademark Aerosil®, with various specifications, by Evonik-Degussa GmbH. It is preferable that polymer powder of the invention comprises less than 3% by weight, preferably from 0.001 to 2% by weight, and very particularly preferably from 0.05 to 1% by weight, of auxiliaries of this type, based on the entirety of the polymers present. The fillers can by way of example be glass particles, metal particles, or ceramic particles, e.g. glass beads, steel shot, or metal granules, or foreign pigments, e.g. transition metal oxides. The pigments can by way of example be titanium dioxide particles based on rutile or anatase, or carbon black particles.

The average particle size of the filler particles here is preferably smaller than or approximately equal to that of the particles of the polyamides. The $d_{50}$ median particle size of the fillers should preferably not exceed the $d_{50}$ median particle size of the polyamides by more than 20%, preferably 15%, and very particularly preferably 5%. A particular restriction on particle size results from the permissible overall height or layer thickness in the rapid prototyping/rapid manufacturing system.

Polymer powder of the invention preferably comprises less than 75% by weight, with preference from 0.001 to 70% by weight, with particular preference from 0.05 to 50% by weight, and with very particular preference from 0.5 to 25% by weight, of fillers of this type, based on the entirety of the polyamides present.

If the stated maximum limits for auxiliaries and/or fillers are exceeded, the result, depending on the filler or auxiliary used, can be marked impairment of the mechanical properties of moldings produced by means of these polymer powders.

It is likewise possible to mix conventional polymer powders with polymer powders of the invention. This method can produce polymer powders with another combination of surface properties. The process for producing these mixtures can be found by way of example in DE 34 41 708.

In order to improve melt flow during the production of the moldings, a leveling agent can be added to the precipitated polyamide powder, examples being metal soaps, preferably the alkali metal or alkaline earth metal salts of the underlying alkanemonocarboxylic acids or dimer acids. The metal soap particles can be incorporated into the polymer particles, but mixtures of fine metal soap particles and polymer particles are also possible.

The amounts used of the metal soaps are from 0.01 to 30% by weight, preferably from 0.5 to 15% by weight, based on the entirety of the polyamides present in the powder. It is preferable to use, as metal soaps, the sodium or calcium salts of the underlying alkanemonocarboxylic acids or dimer acids. Examples of products commercially available are Licomont NaV 101 and Licomont CaV 102 from Clariant.

The following can be added to the polymer powder in order to improve processability or for further modification of said powder: inorganic foreign pigments, e.g. transition metal oxides, stabilizers, e.g. phenols, in particular sterically hindered phenols, leveling agents and powder-flow aids, e.g. fumed silicas, and also filler particles. The amount of said substances added to the polymers, based on the total weight of polymers in the polymer powder, is preferably such as to comply with the concentrations stated for fillers and/or auxiliaries for the polymer powder of the invention.

The present invention also provides processes for producing moldings via layer-by-layer processes in which regions are melted selectively by introducing electromagnetic energy, which use polymer powder of the invention obtained by coprecipitation of at least one polyamide of the AB type, produced by polymerizing lactams having from 10 to 12 carbon atoms in the monomer unit or by polycondensing the corresponding ω-aminocarboxylic acids having from 10 to 12 carbon atoms in the monomer unit and at least one polyamide of the AABB type, produced by polycondensing diamines and dicarboxylic acids having respectively from 10 to 14 carbon atoms in the monomer units.

The invention further provides processes for producing moldings by layer-by-layer processes which use copolyamides of the AABB type in which up to 20 mol % of the molar-equivalent diamines and dicarboxylic acids have been replaced by a lactam and, respectively, an ω-aminocarboxylic acid having from 10 to 12 carbon atoms, and also by copolyamides of the AB type in which up to 20 mol % of the lactams and, respectively, ω-aminocarboxylic acids having from 10 to 12 carbon atoms have been replaced by molar-equivalent diamines and dicarboxylic acids having from 10 to 14 carbon atoms. The use of said coprecipitates comprising copolyamide is advantageous by way of example when the intention is to construct parts with low shrinkage. It is preferable that the respective proportion of comonomer in one or both polyamides to be coprecipitated is restricted to 10 mol %, and it is very preferable that the proportion of comonomer is at most 5 mol %, with a view to higher heat resistance.

It is preferable that the layer-by-layer process uses a coprecipitate made of PA11 or PA12, and as AABB polyamide, a polyamide from the group of PA1010, PA1012, PA1212, and PA1013. It is particularly preferable that the layer-by-layer shaping process uses a powder obtained by coprecipitation from PA11 with PA1010, PA11 with PA 1012, PA12 with PA1012, PA12 with PA1212, or of PA12 with PA1013. The proportion of the AABB polyamide here is from 2 to 98% by mass, preferably from 10 to 90% by mass, and particularly preferably from 30 to 70% by mass. The melting point of the coprecipitated polymer powder of the invention here, determined by means of DSC, is at least 175° C., preferably at least 180° C., and particularly preferably at least 185° C.

The energy is introduced by electromagnetic radiation, and the selectivity is introduced, for example, through masks, application of inhibitors, absorbers, or susceptors, or else by focusing the radiation. Once all of the layers have cooled, the molding of the invention can be removed.

The examples of these processes below serve for illustration, but there is no intention that the invention be restricted thereto.

Laser sintering processes are well known and are based on the selective sintering of polymer particles, where layers of polymer particles are briefly exposed to laser light and the polymer particles exposed to the laser light thus become bonded to one another. Three-dimensional objects are produced by successive sintering of layers of polymer particles. Details of the selective laser sintering process can be found by way of example in the documents U.S. Pat. No. 6,136,948 and WO 96/06881.

Other processes with good suitability are the SIB process as described in WO 01/38061 and a process described in EP 1 015 214. Both processes operate with large-surface-area infrared heating to melt the powder. The selectivity of the melting process is achieved in the first process by applying an inhibitor and in the second process it is achieved by a mask. DE 103 11 438 describes another process. In this, the energy needed for the fusion process is introduced by a microwave generator and the selectivity is achieved by applying a susceptor.

A feature of the moldings of the invention which are produced by a layer-by-layer process in which regions are melted selectively is that they comprise at least one polyamide of the AB type, produced by polycondensing diamines and dicarboxylic acids, preferably a polyamide of the AB type from the group of AB polyamides having from 10 to 12 carbon atoms in the monomer unit, and at least one polyamide from the group of AABB polyamides based on diamines and dicarboxylic acids having respectively from 10 to 14 carbon atoms in the respective monomer unit. Particular preference is given to moldings of PA11 in a mixture with PA1010, PA11 with PA1012, PA12 with PA1012, PA12 with PA1212, and PA12 with PA1013.

It is particularly preferable that the moldings of the invention comprise, as polyamide of the AABB type, PA1010, PA1012, PA1013, or PA1212.

The moldings can moreover comprise fillers and/or auxiliaries, e.g. heat stabilizers, e.g. sterically hindered phenol derivatives. Fillers can by way of example be glass particles, ceramic particles, and also metal particles, for example aluminum granules, iron shot, or appropriate hollow beads. It is preferable that the moldings of the invention comprise glass particles, very particularly glass beads. It is preferable that moldings of the invention comprise less than 3% by weight, preferably from 0.001 to 2% by weight, and very particularly preferably from 0.05 to 1% by weight, of these auxiliaries, based on the entirety of the polymers present. It is likewise preferable that moldings of the invention comprise less than 75% by weight, preferably from 0.001 to 70% by weight, particularly preferably from 0.05 to 50% by weight, and very particularly preferably from 0.5 to 25% by weight, of these fillers, based on the entirety of the polymers present.

The examples below are intended to describe the polymer powder of the invention and use of said powder, without restricting the invention to the examples.

EXAMPLES

The values measured were determined by the following methods, and the measurement methods here can be used both for the starting materials required and for the respective products.

Particle Size Determination

Average particle size and particle size distribution are determined by means of laser scattering. The measurements are made with a Malvern Mastersizer 2000. This is a dry measurement. For each measurement, from 20 to 40 g of powder were metered into the system with the aid of Scirocco dry-dispersion equipment. The feed rate used to operate the vibrating trough was 70%. The pressure of the dispersion air was 3 bar. Each measurement involved a background measurement (10 seconds/10 000 individual measurements). The measurement time for the sample was 5 seconds (5000 individual measurements). The refractive index, and also the blue-light value, was defined as 1.52. Evaluation was based on the Mie theory.

Relative solution viscosity is obtained in 0.5% by weight m-cresol solution in accordance with ISO 307.

BET surface area is determined by means of nitrogen gas adsorption (volumetric, continuous gas supply) in accordance with DIN ISO 9277:2003-05 with gas-adsorption equipment from Micromeritics TriStar 3000 (Software Win 3000, V6.03), thus giving the specific surface area by the BET method. The purity of the nitrogen is 99.996% by volume. A plurality of measurement points (seven) are defined here at relative pressures $p/p_0$ from about 0.05 to about 0.20.

He (purity at least 99.996%) was used for dead volume calibration. The samples were devolatilized respectively for one hour at 25° C. and for 16 hours at 80° C. in vacuo. The specific surface area is based on the devolatilized sample. The evaluation used multipoint determination in accordance with DIN ISO 9277:2003-05, section 7.2.

Bulk densities are measured in accordance with DIN 53468.

Crystallite melting point $T_m$ and enthalpy of fusion are determined by means of DSC (Perkin Elmer Diamond; heating rate 20 K per min.), by a method based on ISO 11357 and DIN 53765.

Powder-flowability is measured by a method based on method A of DIN EN ISO 6186. Powder-flowability is characterized by the powder-flow time. This is the discharge time $t_R$ for a defined amount of powder through a funnel with defined dimensions.

The equipment used for the test is as follows: 500 ml glass beaker, balance with accuracy ±0.5 g, test funnel in accordance with DIN EN ISO 6186 with 10 mm, 15 mm, and 25 mm nozzles, stopwatch readable down to 0.1 second.

150 g of powder are accurately weighed into the glass beaker. Any clumps present are carefully crushed. The aperture of the clean discharge funnel is kept closed while the sample is charged thereto. The time determined then starts from the vibration-free opening of the funnel and ends when all of the powder has been discharged. Dust adhering to the funnel walls is ignored. The discharge nozzle generally selected is nozzle 2 with diameter 15±0.01 mm. However, it is also possible to use discharge nozzle 1 with diameter 10±0.01 mm or discharge nozzle 3 with diameter 25±0.01 mm in accordance with the nature of the powder.

The diameter of the discharge nozzle is recorded as index. $t_{R10}$, $t_{R15}$, $t_{R25}$ The powder-flow time $t_R$ is determined by calculating the average of 3 measurements. The time is stated in whole seconds.

Modulus of elasticity and tensile strength are determined in accordance with DIN/EN/ISO 527, and impact resistance values are determined in accordance with ISO 179/1eA. Vicat temperatures are measured in accordance with ISO 306/2008, in oil.

Example 1

The following starting materials were supplied to a 200 l stirred autoclave to produce a PA 1010:

| | |
|---|---|
| 34.957 kg | of 1,10-decanediamine (as 98, 5, 5% aqueous solution), |
| 40.902 kg | of sebacic and, and |
| 8.6 g | of a 50% aqueous solution of hypophosphorous acid (corresponding to 0.006% by weight) with |
| 25.3 kg | of deionized water |

The starting materials are melted under nitrogen and heated to about 220° C., with stirring, in the closed autoclave, the resultant internal pressure being about 20 bar. Said internal pressure was maintained for 2 hours; the melt was then further heated to 270° C. with continuous depressurization to atmospheric pressure, and was then kept at said temperature for 1.5 hours in the stream of nitrogen. The system was then depressurized to atmospheric pressure within 3 hours, and nitrogen was passed over the melt for a further 3 hours until the torque indicated no further rise of melt viscosity. The melt was then discharged by means of a gear pump and the melt strand was granulated. The granulated material was dried at 80° C. under nitrogen for 24 hours.

Yield: 65 kg

The properties of the product were as follows:

Crystallite melting point $T_m$: 192° C. and 204° C.

Enthalpy of fusion: 78 J/g

Relative solution viscosity $\eta_{rel}$: 1.76

Example 2: Production of PA1012

The following starting materials were reacted with one another by a method based on example 1:

| 34.689 kg | of 1,10-decanediamine (98.7%), |
| 46.289 kg | of dodecanedioic acid and 9.2 g of a 50% aqueous solution of hypophosphorous acid (corresponding to 0.006% by weight) with |
| 20.3 kg | of deionized water |

The properties of the product—yield 73.6 kg—were as follows:
Crystallite melting point $T_m$: 191° C.
Enthalpy of fusion: 74 J/g
Relative solution viscosity $\eta_{rel}$: 1.72

Example 3: Production of PA1013

The following starting materials were reacted with one another by a method based on example 1:

| 33.521 kg | of 1,10-decanediamine (98.7%), |
| 47.384 kg | of brassylic acid and |
| 9.5 g | of a 50% aqueous solution of hypophosphorous acid (corresponding to 0.006% by weight) with |
| 20.5 kg | of deionized water |

The properties of the product were as follows:
Relative solution viscosity $\eta_{rel}$: 1.66
Crystallite melting point $T_m$: 183° C.
Enthalpy of fusion: 71 J/g Example 4: Production of PA1212

The following starting materials were reacted with one another by a method based on example 1:

| 33.366 kg | of 1,12-dodecanediamine (as 97.5% aqueous solution), |
| 37.807 kg | of dodecanedioic acid and |
| 8.1 g | of a 50% aqueous solution of hypophosphorous acid (corresponding to 0.006% by weight) with |
| 20.5 kg | of deionized water |

The properties of the product were as follows:
Crystallite melting point $T_m$: 183° C.
Enthalpy of fusion: 75 J/g
Relative solution viscosity $\eta_{rel}$: 1.81

Example 5: Production of CoPA1012/12 (92:8)

The following starting materials were reacted with one another by a method based on example 1:

| 29.774 kg | of 1,10-decanediamine (as 99.3% aqueous solution), |
| 39.532 kg | of dodecanedioic acid, |
| 5.891 kg | of laurolactam, and |
| 7.9 g | of a 50% aqueous solution of hypophosphorous acid (corresponding to 0.006% by weight) with |
| 25.5 kg | of deionized water |

The properties of the product were as follows:
Crystallite melting point $T_m$: 186° C.
Enthalpy of fusion: 75 J/g
Relative solution viscosity $\eta_{rel}$: 1.72

Example 6: Reprecipitation of Nylon-12 (PA 12) (Not in the Invention)

40 kg of unregulated PA 12 produced by hydrolytic polymerization with a relative solution viscosity of 1.62 and an end group content of 75 mmol/kg of COOH and 69 mmol/kg of $NH_2$ are heated to 145° C. in an 800 l stirred tank within 2.5 hours with 2500 l of ethanol, denatured with 2-butanone and 1% water content, and the mixture is kept at said temperature for 1 hour, with stirring. The jacket temperature is then reduced to 124° C., and the internal temperature is brought to 125° C. with continuous removal of the ethanol by distillation with a cooling rate of 25 K/h, at the same stirrer rotation rate. From now on, the jacket temperature is kept at from 2 K to 3 K below the internal temperature, at the same cooling rate. The internal temperature is brought to 117° C. at the same cooling rate, and then is kept constant for 60 minutes. Further material is then removed by distillation at a cooling rate of 40 K/h, and the internal temperature is thus brought to 111° C. Precipitation, discernible from heat generation, begins at this temperature. The distillation rate is increased to the extent required to prevent the internal temperature from rising above 111.3° C. After 25 minutes, the internal temperature falls, indicating that precipitation has ended. The temperature of the suspension is brought to 45° C. through further removal of material by distillation and cooling by way of the jacket, and then the suspension is transferred to a paddle dryer. The ethanol is removed by distillation at 70° C./400 mbar, and the residue is then further dried for 3 hours at 20 mbar/86° C.

This gives a precipitated PA 12 with an average grain diameter of 55 µm. Bulk density was 435 g/l.

Example 7: Reprecipitation of Nylon-11 (PA 11) (Not in the Invention)

By analogy with example 6, 40 kg of a commercially available granulated PA11 material (RILSAN® BMNO TL from ARKEMA) are reprecipitated to give a powder with the following properties:
Crystallite melting point $T_m$: 192° C. and 200° C.
Enthalpy of fusion: 128 J/g
Relative solution viscosity $\eta_{rel}$: 1.66
Bulk density: 391 g/l BET: 4.80 m²/g
D(10%)=44 µm D(50%)=59 µm D (90%)=84 µm Example 8: Reprecipitation of PA 1010 (Not in the Invention)

By a method based on example 6, 40 kg of the PA 1010 sample obtained in example 1 were reprecipitated; the precipitation conditions here were altered in comparison with example 10 as follows:
Dissolution temperature: 155° C., nucleation temperature/time: 128° C./60 min.
Precipitation temperature: 120° C., precipitation time: 1 hour, stirrer rotation rate: 90 rpm
Crystallite melting point $T_m$: 192° C. and 206° C.
Enthalpy of fusion: 128 J/g Relative solution viscosity $\eta_{rel}$: 1.69
Bulk density: 380 g/l BET: 6.80 m²/g
D(10%)=44 μm D(50%)=69 μm D(90%)=103 μm

Example 9: Reprecipitation of PA 1012 (Not in the Invention)

In accordance with example 6, 40 kg of the sample of granulated PA 1012 material obtained in example 2 were reprecipitated, and the precipitation conditions here were altered as follows in comparison with example 6:
Dissolution temperature: 155° C., nucleation temperature: 141° C., precipitation temperature: 123° C., precipitation time: 40 minutes, stirrer rotation rate: 110 rpm
  Crystallite melting point $T_m$: 191° C. and 202° C.
  Enthalpy of fusion: 148 J/g
  Relative solution viscosity $\eta_{rel}$: 1.69
  Bulk density: 430 g/l BET: 3.90 m²/g
  D(10%)=34 μm D(50%)=65 μm D(90%)=94 μm

Example 10: Reprecipitation of PA 1212 (Not in the Invention)

In accordance with example 6, 40 kg of the sample of granulated PA 1212 material obtained in example 4 were reprecipitated, and the precipitation conditions here were altered as follows:
Dissolution temperature: 155° C., nucleation temperature: 123° C., nucleation time: 60 min.
Precipitation temperature: 117° C., precipitation time: 60 minutes, stirrer rotation rate: 110 rpm
  Bulk density: 392 g/l BET: 5.60 m²/g
  D(10%)=33 μm D(50%)=75 μm D(90%)=114 μm
  Crystallite melting point $T_m$: 187° C. and 194° C.
  Enthalpy of fusion: 143 J/g
  Relative solution viscosity $\eta_{rel}$: 1.79

Example 11: Reprecipitation of PA 1013 (Not in the Invention)

In accordance with example 6, 40 kg of the sample of granulated PA 1013 material obtained in example 3 were reprecipitated, and the precipitation conditions here were altered as follows:
Dissolution temperature: 145° C., nucleation temperature: 113° C., nucleation time: 60 min.
Precipitation temperature: 102° C., precipitation time: 60 minutes, stirrer rotation rate: 110 rpm
  Bulk density: 452 g/l BET: 4.40 m²/g
  D(10%)=25 μm D(50%)=59 μm D(90%)=94 μm
  Crystallite melting point $T_m$: 182° C. and 190° C.
  Enthalpy of fusion: 143 J/g
  Relative solution viscosity $\eta_{rel}$: 1.62

Example 12: Joint Reprecipitation of PA 1010 with PA 11 (in the Invention)

In accordance with example 6, 20 kg of each of the following were reprecipitated: the sample of granulated PA 1010 material obtained in example 1 and the RILSAN® BMNO TL (ARKEMA) used in example 7, and the precipitation conditions here were altered as follows:
Dissolution temperature: 145° C., nucleation temperature: 118° C., nucleation time: 60 min.
Precipitation temperature: 112° C., precipitation time: 60 minutes, stirrer rotation rate: 110 rpm
  Bulk density: 498 g/l BET: 1.40 m²/g
  D(10%)=41 μm D(50%)=66 μm D(90%)=103 μm
  Crystallite melting point $T_m$: 192° C. and 198° C.
  Enthalpy of fusion: 127 J/g
  Relative solution viscosity $\eta_{rel}$: 1.72

Example 13: Joint Reprecipitation of PA 1012 with PA 11 (in the Invention)

In accordance with example 6, 20 kg of each of the following were reprecipitated: the sample of granulated PA 1012 material obtained in example 2 and the RILSAN® BMNO TL (ARKEMA) used in example 7, and the precipitation conditions here were altered as follows:
Dissolution temperature: 155° C., nucleation temperature: 118° C., nucleation time: 60 min.
Precipitation temperature: 108° C., precipitation time: 60 minutes, stirrer rotation rate: 110 rpm
  Bulk density: 438 g/l BET: 7.40 m²/g
  D(10%)=44 μm D(50%)=69 μm D(90%)=104 μm
  Crystallite melting point $T_m$: 192° C. and 198° C.
  Enthalpy of fusion: 127 J/g
  Relative solution viscosity $\eta_{rel}$: 1.72

Example 14: Joint Reprecipitation of PA 1012 with PA 12 (in the Invention)

In accordance with example 6, 20 kg of each of the following were reprecipitated: the sample of granulated PA 1012 material obtained in example 2 and the unregulated PA 12 used in example 6, and the precipitation conditions here were altered as follows:
Dissolution temperature: 155° C., nucleation temperature: 118° C., nucleation time: 60 min.
Precipitation temperature: 111° C., precipitation time: 60 minutes, stirrer rotation rate: 110 rpm
  Bulk density: 425 g/l BET: 8.10 m²/g
  D(10%)=34 μm D(50%)=62 μm D(90%)=114 μm
  Crystallite melting point $T_m$: 198° C.
  Enthalpy of fusion: 137 J/g
  Relative solution viscosity $\eta_{rel}$: 1.64

Example 15: Joint Reprecipitation of PA 1013 with PA12 (in the Invention)

In accordance with example 6, 20 kg of each of the following were reprecipitated: the sample of granulated PA 1013 material obtained in example 3 and the unregulated PA12 used in example 6, and the precipitation conditions here were altered as follows:
Dissolution temperature: 145° C., nucleation temperature: 114° C., nucleation time: 60 min.
Precipitation temperature: 101° C., precipitation time: 60 minutes, stirrer rotation rate: 110 rpm
  Bulk density: 425 g/l BET: 7.20 m²/g
  D(10%)=23 μm D(50%)=46 μm D(90%)=78 μm
  Crystallite melting point $T_m$: 183° C.
  Enthalpy of fusion: 117 J/g
  Relative solution viscosity $\eta_{rel}$: 1.64

Example 16: Joint Reprecipitation of PA 1212 with PA12 (in the Invention)

In accordance with example 6, 20 kg of each of the following were reprecipitated: the sample of granulated PA 1212 material obtained in example 4 and the unregulated PA12 used in example 6, and the precipitation conditions here were altered as follows:

Dissolution temperature: 152° C., nucleation temperature: 118° C., nucleation time: 60 min.

Precipitation temperature: 111° C., precipitation time: 60 minutes, stirrer rotation rate: 110 rpm Bulk density: 408 g/l BET: 8.1 m$^2$/g D(10%)=60 μm D(50%)=85 μm D(90%)=110 μm Crystallite melting point $T_m$: 186° C.

Enthalpy of fusion: 137 J/g

Relative solution viscosity $\eta_{rel}$: 1.76

Example 17: Joint Reprecipitation of CoPA 1012/12 with PA12 (in the Invention)

In accordance with example 6, 20 kg of each of the following were reprecipitated: the sample of granulated CoPA1012/12 material obtained in example 5 and the unregulated PA12 used in example 6, and the precipitation conditions here were altered as follows:

Dissolution temperature: 145° C., nucleation temperature: 112° C., nucleation time: 45 min.

Precipitation temperature: 107° C., precipitation time: 60 minutes, stirrer rotation rate: 120 rpm Bulk density: 424 g/l BET: 3.2 m$^2$/g D(10%)=31 μm D(50%)=54 μm D(90%)=89 μm Crystallite melting point $T_m$: 185° C.

Enthalpy of fusion: 120 J/g

Relative solution viscosity $\eta_{rel}$: 1.65

Example 18: Joint Reprecipitation of CoPA 1012/12 with PA12 (in the Invention)

In accordance with example 6, 20 kg of each of the following were reprecipitated: the sample of granulated CoPA 1012/12 material obtained in example 5 and the unregulated PA12 used in example 6, and the precipitation conditions here were altered as follows:

Dissolution temperature: 145° C., nucleation temperature: 112° C., nucleation time: 45 min.

Precipitation temperature: 110° C., precipitation time: 60 minutes, stirrer rotation rate: 120 rpm Bulk density: 410 g/l BET: 4.8 m$^2$/g D(10%)=29 μm D(50%)=52 μm D(90%)=91 μm Crystallite melting point $T_m$: 185° C.

Enthalpy of fusion: 120 J/g

Relative solution viscosity $\eta_{rel}$: 1.64

Example 19: Joint Reprecipitation of PA 1012 with PA12 (in the Invention)

In accordance with example 6, 2-kg of the sample of granulated PA 1012 material obtained in example 2 and 38 kg of the unregulated PA12 used in example 6 were reprecipitated, and the precipitation conditions were altered as follows:

Dissolution temperature: 142° C., nucleation temperature: none, nucleation time: none Precipitation temperature: 107° C., precipitation time: 120 minutes, stirrer rotation rate: 110 rpm Bulk density: 426 g/l BET: 5.80 m$^2$/g D(10%)=40 μm D(50%)=62 μm D(90%)=96 μm Crystallite melting point $T_m$: 184° C.

Enthalpy of fusion: 119 J/g

Relative solution viscosity $\eta_{rel}$: 1.61

Example 20: Joint Reprecipitation of PA 1012 with PA12 (in the Invention)

In accordance with example 6, 2-kg of the sample of granulated PA 1012 material obtained in example 2 and 38 kg of the unregulated PA12 used in example 6 were reprecipitated, and the precipitation conditions were altered as follows:

Dissolution temperature: 142° C., nucleation temperature: none, nucleation time: none Precipitation temperature: 107° C., precipitation time: 120 minutes, stirrer rotation rate: 130 rpm Bulk density: 409 g/l BET: 7.50 m$^2$/g D(10%)=37 μm D(50%)=55 μm D(90%)=82 μm Crystallite melting point $T_m$: 185° C.

Enthalpy of fusion: 119 J/g

Relative solution viscosity $\eta_{rel}$: 1.61

Example 21: Joint Reprecipitation of PA 1013 with PA12 (in the Invention)

In accordance with example 6, 6 kg of the sample of granulated PA 1013 material obtained in example 3 and 34 kg of the unregulated PA12 used in example 6 were reprecipitated, and the precipitation conditions were altered as follows:

Dissolution temperature: 147° C., nucleation temperature: 113° C., nucleation time: 30 min.

Precipitation temperature: 109° C., precipitation time: 120 minutes, stirrer rotation rate: 110 rpm Bulk density: 378 g/l BET: 8.20 m$^2$/g D(10%)=28 μm D(50%)=51 μm D(90%)=83 μm Crystallite melting point $T_m$: 197° C.

Enthalpy of fusion: 124 J/g

Relative solution viscosity 1.64

The powder of the invention also features good powder-flow properties and, respectively, good application properties. The amount of the powder-flow aid required can be reduced, or powder-flow aid can be omitted entirely. The table below shows the results observed:

| Product | Applicable on SPro 60 HDHS 3D systems | | Powder-flow time $t_{R15}$ in sec. | |
|---|---|---|---|---|
| | with powder-flow aid | without powder-flow aid | with powder-flow aid | without powder-flow aid |
| Powder from ex. 6 | yes | no | 25.7 | powder does not flow |
| Powder from ex. 19 | yes | yes | 19 | 28 |
| Powder from ex. 20 | yes | yes | 17 | 24 |
| Powder from ex. 21 | yes | yes | 32 | 111 (with tapping) |

Examples 22-25: Processing of the PA12/PA1013 Powders of the Invention from Example 15 to Give Moldings by the SLS Process Unless otherwise mentioned, the processing experiments below were carried out in an EOSINT P380 machine from EOS, Krailing:

Example 22

Processing Conditions:
　　Process chamber heating: 165° C.
　　Layer thickness: 0.15 mm
　　Laser power rating: 19 W
　　Irradiation velocity: 1100 mm/s
　　Hatch spacing: 0.3 mm
Tensile Test Results:
　　Modulus of elasticity: 1800 MPa
　　Tensile strength: 46.5 MPa
　　Notched impact resistance at −30° C.: 5.45 kJ/m$^2$

Example 23

Processing Conditions:
　　Process chamber heating: 164° C.
　　Layer thickness: 0.15 mm
　　Laser power rating: 19 W
　　Irradiation velocity: 1100 mm/s
　　Hatch spacing: 0.3 mm
Tensile Test Results:
　　Modulus of elasticity: 1800 MPa
　　Tensile strength: 48.6 MPa
　　Notched impact resistance at −30° C.: 4.14 kJ/m$^2$

Example 24

Process Conditions:
　　Process chamber heating: 167° C.
　　Layer thickness: 0.15 mm
　　Laser power rating: 19 W
　　Irradiation velocity: 1100 mm/s
　　Hatch spacing: 0.3 mm
Tensile Test Results:
　　Modulus of elasticity: 1800 MPa
　　Tensile strength: 47.7 MPa
　　Notched impact resistance at −30° C.: 4.2 kJ/m$^2$

Example 25

Process Conditions:
　　Process chamber heating: 175° C.
　　Layer thickness: 0.15 mm
　　Laser power rating: 19 W
　　Irradiation velocity: 1100 mm/s
　　Hatch spacing: 0.3 mm
Tensile Test Results:
　　Modulus of elasticity: 1800 MPa
　　Tensile strength: 51.0 MPa
　　Vicat A—temperature: 176° C.

Examples 26-28: Processing of the PA12/PA1012 Powders from Example 14 to Give Moldings by the SLS Process Unless otherwise mentioned, the processing experiments below were carried out in an EOSINT P380 machine from EOS, Krailing:

Example 26

Process Conditions
　　Process chamber heating: 168° C.
　　Layer thickness: 0.15 mm
　　Laser power rating: 19 W
　　Irradiation velocity: 1100 mm/s
　　Hatch spacing: 0.3 mm
Tensile Test Results
　　Modulus of elasticity: 1650 MPa
　　Tensile strength: 49 MPa

Example 27

Processing Conditions
　　Process chamber heating: 169° C.
　　Layer thickness: 0.15 mm
　　Laser power rating: 19 W
　　Irradiation velocity: 1100 mm/s
　　Hatch spacing: 0.3 mm
Tensile Test Results
　　Modulus of elasticity: 1600 MPa
　　Tensile strength: 48 MPa

Example 28

Processing Conditions:
　　Processing in a HiQ SLS system machine
　　Processing temperature: 169° C.
　　Layer thickness: 0.1 mm
　　Laser power rating: 13 W
　　Irradiation velocity: 5 m/s
　　Hatch spacing: 0.3 mm
Tensile Test Results
　　Modulus of elasticity: 1650 MPa
　　Tensile strength: 47 MPa

Example 29: Processing Example with Material from Example 19

Processing on 3D Systems SPro 60 HDHS
　　Processing temperature: 168° C.
　　Layer thickness: 0.1 mm
　　Laser power rating: 58 W
　　Irradiation velocity: 12 m/s
　　Hatch spacing: 0.2 mm
Tensile Test Results
　　Modulus of elasticity: 1800 MPa
　　Tensile strength: 48 MPa

Example 30: Processing Example with Material from Example 20

Processing on 3D Systems SPro 60 HDHS
　　Processing temperature: 169° C.
　　Layer thickness: 0.1 mm
　　Laser power rating: 58 W
　　Irradiation velocity: 12 m/s
　　Hatch spacing: 0.2 mm
Tensile Test Results
　　Modulus of elasticity: 1850 MPa
　　Tensile strength: 48 MPa

Example 31: Processing Example with Material from Example 21

Processing on 3D Systems SPro 60 HDHS
　　Processing temperature: 166° C.
　　Layer thickness: 0.1 mm
　　Laser power rating: 58 W
　　Irradiation velocity: 12 m/s
　　Hatch spacing: 0.2 mm Tensile Test Results
  Modulus of elasticity: 1750 MPa
  Tensile strength: 40 MPa Example 32: Processing of the PA12/PA1212 Powder from Example 16 to Give Moldings by the SLS Process. The Material was Processed in an EOSINT P380

Processing Conditions:
  Process chamber heating: 168° C.
  Layer thickness: 0.15 mm
  Laser power rating: 19 W
  Irradiation velocity: 1100 mm/s
  Hatch spacing: 0.3 mm Examples 33-34: Processing of the PA12 Powders from Example 6 to Give Moldings, Comparative Examples, Not in the Invention The processing experiments were carried out in an EOSINT P380 machine from EOS, Krailing:

Example 33

Tensile Test Results:
  Modulus of elasticity: 1750 MPa
  Tensile strength: 50 MPa
  Notched impact resistance at −30° C.: 3.09 kJ/m²
  Vicat A temperature: 165° C.

Example 34

Processing Conditions:
  Process chamber heating: 179° C.
  Layer thickness: 0.15 mm
  Laser power rating: 19 W
  Irradiation velocity: 1100 mm/s
  Hatch spacing: 0.3 mm
Tensile Test Results:
  Modulus of elasticity: 1750 MPa
  Tensile strength: 48 MPa
  Notched impact resistance at −30° C.: 3.09 k J/m²
  Vicat A temperature: 165° C.

Example 35: Processing of the PA1013 Powder from Example 11 to Give Moldings, Comparative Examples, Not in the Invention The materials were processed in an EOSINT P380 machine from EOS, Krailing:
Processing Conditions:
  Process chamber temperature: 169° C.
  Layer thickness: 0.15 mm
  Laser power rating: 24 W
  Irradiation velocity: 1100 mm/s
  Hatch spacing: 0.3 mm
Tensile Test Results:
  Modulus of elasticity: 1900 MPa
  Tensile strength: 47 MPa
  Notched impact resistance at −30° C.: 2.92 kJ/m²

What is claimed is:

1. A polymer powder, comprising:
  a polyamide of AB type, produced by polymerizing at least one lactam having from 10 to 12 carbon atoms in a monomer unit or by polycondensing at least one corresponding ω-aminocarboxylic acid having from 10 to 12 carbon atoms in a monomer unit; and
  a polyamide of AABB type, produced by polycondensing at least one diamine and at least one dicarboxylic acid having respectively from 10 to 14 carbon atoms in monomer units,
  wherein:
  the polyamide of the AB type and the polyamide of the AABB type are prepared separately and then coprecipitated to form the polymer powder;
  the polymer powder is a physical mixture of the polyamide of the AB type and the polyamide of the AABB type; and the polymer powder has a melting point of 186° C. or higher.

2. The polymer powder of claim 1, comprising at least nylon-11 or nylon-12 and at least one homopolyamide based on PA1010, PA1012, PA1212 or PA1013.

3. The polymer powder of claim 1, comprising the polyamide of the AB type and the polyamide of the AABB type in a ratio by mass, AB:AABB, of from 98:2 to 2:98.

4. The polymer powder of claim 1, wherein a relative solution viscosity of the polymer powder is from 1.4 to 2.1, measured in a 0.5% by weight solution in m-cresol in accordance with ISO 307.

5. The polymer powder of claim 1, wherein an average particle size of the polymer powder is from 10 to 250 μm.

6. The polymer powder of claim 1, further comprising an auxiliary, a filler, or both.

7. The polymer powder of claim 1, wherein the polyamide of the AB type is produced by polymerizing at least one lactam having from 10 to 12 carbon atoms in a monomer unit.

8. The polymer powder of claim 1, wherein the polyamide of the AB type is produced by polycondensing at least one ω-aminocarboxylic acid having from 10 to 12 carbon atoms in a monomer unit.

9. The polymer powder of claim 1, comprising the polyamide of the AB type and the polyamide of the AABB type in a ratio by mass, AB:AABB, of from 50:50 to 95:5.

10. The polymer powder of claim 1, comprising the polyamide of the AB type and the polyamide of the AABB type in a ratio by mass, AB:AABB, of from 85:15 to 95:5.

11. The polymer powder of claim 1, which exhibits an enthalpy of fusion of from 117 to 137 J/g.

12. A molding obtained from the polymer powder of claim 1 by a direct progressive construction process.

13. The molding of claim 12, wherein the molding is produced by a layer-by-layer process in which regions of a respective powder layer are melted selectively by introducing electromagnetic energy, and the selectivity is achieved by: applying at least one susceptor, at least one inhibitor, or at least one absorber to the respective powder layer; applying at least on mask to the respective powder layer; or focusing a laser beam on the regions of the respective powder layer.

14. A process for producing the polymer powder of claim 1, the process comprising: codissolving the polyamide of the AB type and the polyamide of the AABB type by heating in an alcohol having from 1 to 3 carbon atoms; lowering the temperature in one or more stages to a temperature at which a copolyamide precipitates; isolating the copolyamide from the solvent and drying the copolyamide; and optionally mixing an auxiliary, a filler, or both, into the powder.

15. The process of claim 14, comprising: codissolving the polyamide of the AB type and the polyamide of the AABB type under an autogenous pressure at a temperature of from 130° C. to 180° C. and then lowering the temperature in one or more stages to from 90° C. to 128° C.

16. The process of claim 14, wherein, after the codissolving, the temperature is maintained at from 110° C. to 128° C. for 10 minutes to 3 hours and then the temperature is lowered in one or more further stages to from 90° C. to 118° C.

17. A process for producing moldings by a layer-by-layer process, the process comprising performing a selective melting of regions of a respective polymer powder layer by introducing electromagnetic energy, wherein the respective polymer powder layer comprises the polymer powder of claim 1.

18. The process of claim 17, wherein the selective melting is achieved by: applying at least one susceptor, at least one inhibitor, or at least one absorber to the respective polymer powder layer; applying at least one mask to the respective polymer powder layer; or on the regions of the respective polymer powder layer.

* * * * *